April 24, 1962 R. CALVERT 3,031,614
ELECTRICAL MEASURING BRIDGES
Filed Jan. 9, 1959
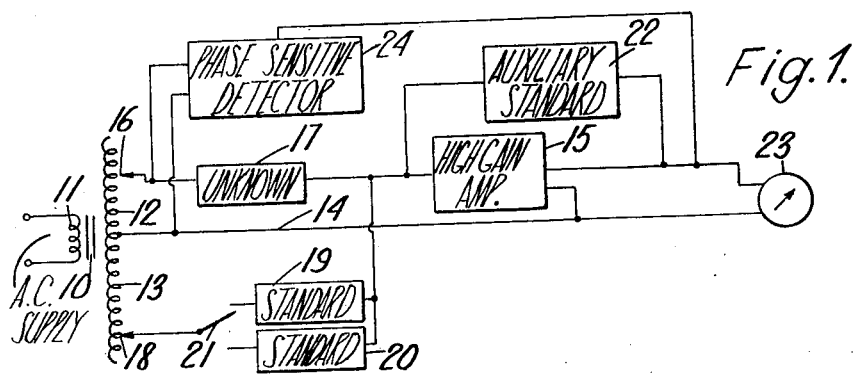
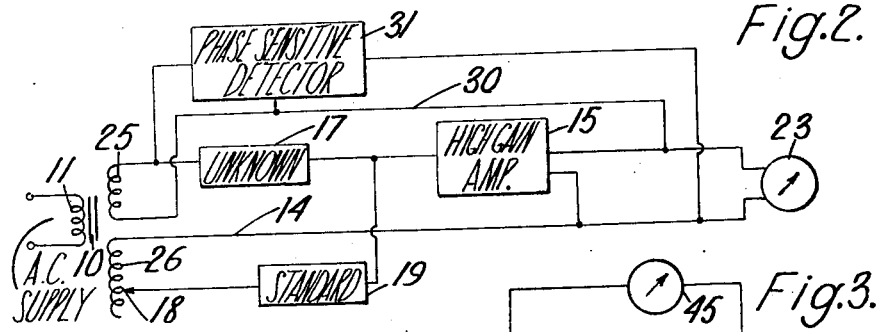
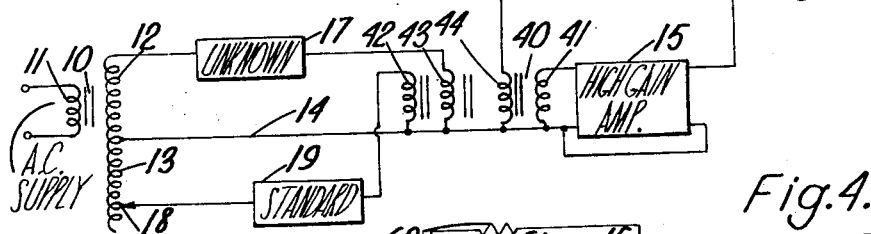
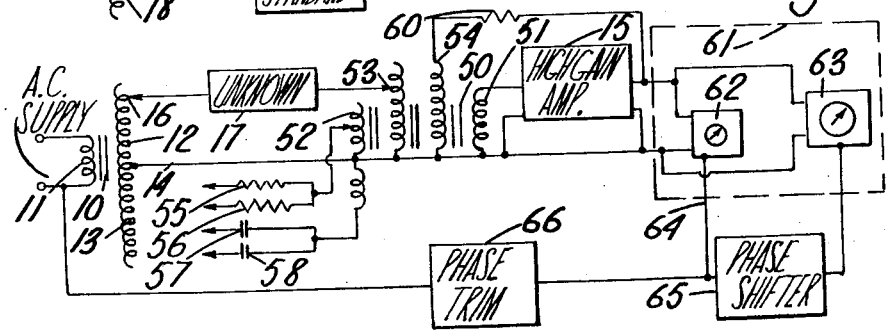

3,031,614
Patented Apr. 24, 1962

3,031,614
ELECTRICAL MEASURING BRIDGES
Raymond Calvert, Chessington, England, assignor to The Wayne Kerr Laboratories Limited, Chessington, England, a British company
Filed Jan. 9, 1959, Ser. No. 785,873
Claims priority, application Great Britain Jan. 10, 1958
4 Claims. (Cl. 324—57)

This invention relates to electrical measuring bridges for measuring an unknown impedance and particularly to bridges in which measurement of the unknown is effected by step adjustments to effect an approximate balance and in which a fine reading is made to determine the exact value of the unknown and has for its principal object to provide an improved form of bridge circuit in which the fine measurement may be made without necessity for adjusting any component of the bridge circuit.

It is a common practice in electrical bridge circuits to effect an approximate balance by step adjustments of one or both ratio arms or of a standard impedance or impedances and then to obtain exact balance by adjustof a continuously variable component. It is also known in electrical bridge circuits to make use of the out-of-balance current to operate a servo-mechanism for mechanically driving an adjustable component in the bridge circuit or for mechanically adjusting a potentiometer controlling the potential applied to a standard impedance.

According to this invention an electrical bridge circuit for measuring an unknown impedance comprises a standard impedance, voltage sources for applying voltages of known ratio to the standard and unknown impedances, a high gain amplifier having an input circuit and an output circuit, means for feeding the difference of currents through the standard and unknown impedances to said input circuit, means coupling said output circuit to said input circuit to feed a current to the input circuit in opposition to said difference of currents, and an indicator coupled to said output circuit to indicate the amplifier output. With this arrangement the amplifier will amplify the out-of-balance input current to the amplifier and will feed back to the input a current such as to tend to reduce the out-of-balance current at the input to the amplifier. The system will, therefore, inherently balance itself with a net input to the amplifier which will be very small for a high gain amplifier. The indicator indicates the magnitude of the amplifier output and hence the magnitude of the feedback necessary to achieve balance. This output thus represents the necessary correction to be effected to the bridge circuit to effect the balance and can be directly indicated on a meter or other indicating instrument. In general the bridge circuit will be provided with an adjustable standard impedance and/or means for adjusting the voltages applied to the standard and/or unknown impedances. These adjustments which are preferably made in steps permit of a coarse balance being obtained. Such step adjustments enable a coarse balance to be obtained whilst the feedback circuit with the indicator will give the fractional correction necessary within a step of the coarse adjustment. For example, if the step adjustments comprise two decade sets thus giving one hundred steps of adjustment to effect the approximate balance, the indicating meter need only, at full scale indicate a one hundredth of the maximum possible value of the unknown and it can be readily made to give a very high degree of accuracy in determining the fraction of this step representing the required correction to the reading indicated by the coarse adjustment.

The invention is applicable both to alternating current and to direct current bridges. In an alternating current bridge the voltage sources may conveniently comprise tightly coupled windings on a transformer although other voltage sources may be employed.

Considered from another aspect the invention includes within its scope an electrical bridge circuit in which measurement of an unknown impedance is effected by step adjustments to effect an approximate balance and in which a fine reading is made to determine the exact value of the unknown impedance and comprising two ratio arms for producing voltages which are applied respectively to the unknown and a standard impedance, and a detector for measuring the difference in the currents passing through the unknown and standard impedances and characterised in that said detector includes a high gain amplifier to amplify the out-of-balance current and to produce therefrom either an output voltage which is combined in series with the voltage across one of the ratio arms to reduce the out-of-balance current at the detector input or an output current which is fed to the detector input in opposition to the out-of-balance current, and an indicator for indicating the magnitude of the amplifier output. In a bridge circuit in which an output current is fed to the detector input in opposition to the out-of-balance current, this output current may be derived, in one arrangement, by applying the amplifier output voltage to an auxiliary standard impedance in which case the indicator conveniently comprises a voltmeter connected to the amplifier output. In another arrangement, the detector input circuit may include a transformer with a plurality of input windings and the output current from the amplifier applied to one of said windings; in this arrangement the indicator for indicating the magnitude of the amplifier output may comprise a current measuring indicator in the circuit feeding said one of the windings.

The following is a description of a number of embodiments of the invention, reference being made to the accompanying drawings in which FIGURES 1, 2, 3 and 4 are block diagrams of electrical bridge circuits for measuring unknown impedances.

FIGURE 1 illustrates an alternating current bridge having an input transformer 10 with a primary winding 11 arranged to be energised from an alternating current supply source. The transformer 10 has two secondary windings 12, 13 which are closely coupled and are connected in series to form two ratio arms of the bridge. The junction of these two ratio arms 12, 13 is connected by a line 14, which will be referred to hereinafter as a neutral line, to one input terminal of a high gain amplifier 15. A tap 16 on the ratio arm 12 is connected through the unknown impedance 17, which is to be measured, to the other input terminal of the amplifier 15, whilst a tap 18 on the ratio arm 13 is connected through a standard impedance to the same input terminal of the amplifier to which the unknown impedance 17 is connected. In FIGURE 1 there are shown two alternative standard impedances 19, 20 which may be selectively connected into the circuit between the tap 18 and the amplifier by means of a switch 21. The ratio arms 12, 13 are arranged in such sense that the two inputs to the amplifier through the unknown standard impedances are in opposition. The output voltage of the amplifier 15 is applied to a further auxiliary standard impedance 22 to feed a current into the amplifier input and an indicating voltmeter 23 is connected across the amplifier output.

It will be seen that in the arrangement of FIGURE 1 the amplifier 15 will amplify the net input derived from the currents through the unknown impedance 17, the standard impedance 19 or 20 and the auxiliary standard 22. The amplifier 15, if it has a high gain, will provide a feedback current through the auxiliary standard 22 such as to reduce the net input to the amplifier almost to zero. Using the following notation:

$E_u$, voltage across the ratio ram 12

$E_s$, voltage across the ratio arm 13
$E_a$, amplifier output voltage
$I_u$, current through unknown impedance 17
$I_s$, current through standard impedance 19 or 20
$I_a$, current through auxiliary standard 22
$Y_u$, admittance of unknown impedance
$Y_s$, admittance of standard impedance 19 or 20
$Y_a$, admittance of auxiliary impedance 22 and assuming the amplifier gain is so high that, to the order of accuracy required, the voltage at the amplifier input terminals can be ignored compared with $E_u$, $E_s$ and $E_a$, then $$I_u = Y_u E_u$$
$$I_s = Y_s E_s$$
$$I_a = Y_a E_a$$

and $$I_u = I_s + I_a$$

Thus $$Y_u = \frac{E_s Y_s}{E_u} + \frac{E_a Y_a}{E_u}$$

The admittance of the unknown impedance is thus the sum of two quantities the first of which depends on the ratio of the applied voltages and the magnitude of the standard impedance 19 or 20 and which may thus be read from switches controlling these quantities and a second term which can be read from the meter 23 provided the latter is calibrated in accordance with the impedance of the auxiliary standard 22. It will be noted that this second term strictly depends on the ratio of the output voltage of the amplifier 15 to the voltage applied to the unknown impedance 17 and hence the meter 23 may readily be standardised by applying the voltage from the tap 16 on the ratio arm 12 directly to the meter. The first term provides the coarse indication and the second term the fine indication. By suitable choice of standards or adjustable taps, the coarse indication may be in decade steps whilst the meter may be calibrated to indicated fractions of a step.

It is generally convenient to select the range of measurement by stepwise adjustment of the tap 16 on the ratio arm 12. Although in FIGURE 1 there is shown an adjustable tap on the ratio arm 13 and switchable standard impedances 19, 20, it will be appreciated that for many purposes it may not be necessary to have both these adjustable facilities and generally it is more convenient to use an adjustable tap on the ratio arm 13 rather than to have an adjustable standard.

In the arrangement of FIGURE 1 the standard impedance 19 or 20 is preferably made such that the current through it is less than the current through the unknown impedance 17. The feedback current will thus be in phase with the input current to the amplifier through the standard impedance 19 or 20 and the indicator 23 will give a reading which increases as the difference between the current through the unknown impedance 17 and the current through the standard impedance 19 or 20 increases. If necessary, however, by suitably calibrating the indicator 23, the standard impedance can be made such that the current through it is higher than that through the unknown impedance so that the feedback current through the auxiliary standard 22 is in opposition to the current through the standard 19 or 20. If a phase reversal of the feedback current is required, a transformer may be provided in the amplifier output circuit.

If the amplifier is a single stage electronic valve amplifier with its output taken from the anode circuit, the output will be in opposite phase to the input, as is required if the current through the unknown is greater than the current through the first standard impedance. If a two stage amplifier is used, each stage giving a phase reversal, the necessary further phase reversal can be obtained with a transformer as described above. This transformer may also be used for adjusting the amount of the feedback by using an adjustably tapped transformer.

Preferably a phase sensitive detector 24 is provided for indicating whether the current through the unknown impedance is greater or less than the current through the first standard impedance. Such a detector 24 might comprise an electronic valve arranged as a switching circuit, for example a pentode valve may be arranged with a voltage (from the alternating supply source) in phase with the current through the unknown impedance fed to the screen grid and the amplifier output voltage fed to the control grid so that the valve will only conduct if the amplifier output voltage is in phase with the input supply voltage. An indicator operated by the current passed by the valve can thus show whether the amplifier output is in phase or out of phase with the supply voltage.

The bridge circuit in FIGURE 1 has been described in a simple form and numerous modifications are possible. For example, instead of having adjustable tappings on one or both of the ratio arms 12, 13, an adjustable potentiometer may be connected across one or each arm.

It will be seen that, provided the bridge is approximately balanced no adjustment of any circuit element is necessary to effect complete balance, but the necessary fine reading can be made directly from the indicator.

Another embodiment of the invention is illustrated in FIGURE 2 in which, as in FIGURE 1, there is provided an input transformer 10 having a primary winding 11 energised from an alternating current supply source and two closely coupled secondary windings 25, 26 forming ratio arms. The arrangement of FIGURE 2, like that of FIGURE 1 also has a neutral line 14, a high gain amplifier 15, a standard impedance 19 and an indicating voltmeter 23. In the arrangement of FIGURE 2, however, the two ratio arms 25, 26 are not connected in series. One end of the ratio arm 26 is connected to the neutral line 14, whilst a tap 18 on that ratio arm is connected through a standard impedance 19 to the input of the high gain amplifier 15. In FIGURE 2, for simplicity, only one standard impedance is shown, although obviously a number of switchable standards may be provided as in FIGURE 1. The unknown impedance 17 is connected between one end of the secondary winding 25 and the amplifier input. The feedback voltage from the amplifier output is fed by a lead 30 to be applied, in series with the voltage across the ratio arm 25, to the unknown impedance 17. The output voltage of the amplifier 15 is indicated by the voltmeter 23 as in the arrangement of FIGURE 1.

It will be seen that in the arrangement of FIGURE 2, the amplifier output will provide an additional voltage for feeding through the unknown impedance 17 which voltage is added to that supplied by the secondary winding 25 of input transformer 10. The feedback may be effected through a transformer (not shown) to give phase reversal if necessary and such a transformer may be tapped to enable the amount of feedback to be adjusted. As the amplifier has a high gain the feedback will tend to keep the input current to the amplifier small compared with the currents through the unknown and standard impedances 17 and 19. Using the same notation as before and assuming the gain of the amplifier is sufficiently high that its input current $I_i$ can be ignored compared with $I_u$ and $I_s$, then:

The voltage across the unknown impedance $17 = E_u + E_a$
The voltage across the standard impedance $19 = E_s$
and since, with this assumption, $I_u = I_s$ $$\frac{E_u + E_a}{Z_u} = \frac{E_s}{Z_s}$$

where $Z_u$ is the unknown impedance and $Z_s$ is the impedance of standard 19.

Thus $$Z_u = \frac{Z_s E_u}{E_s} + \frac{Z_s E_a}{E_s}$$

It will thus be seen that the impedance of the unknown is represented by the sum of two quantities, the first of which may be determined from the setting of switches on the instrument and the second of which may be read from the meter 23. The first term provides the coarse indication whilst the second term provides the fine indication.

In the arrangement of FIGURE 2 a phase sensitive detector 31 similar to that described with reference to FIGURE 1 may be provided to indicate whether the amplifier output is in phase or out of phase with the current through the unknown impedance.

Instead of feeding the amplifier voltage in series with ratio arm 25, it might be fed in series with the ratio arm 26. The arrangement then becomes the equivalent of FIGURE 1 with the standard impedance 19 instead of the auxiliary standard 22 in the feedback circuit.

FIGURE 3 illustrates another embodiment of the invention which, as in FIGURES 1 and 2, has an input transformer 10 with a primary winding 11 energised from an alternating current supply source and having secondary windings 12, 13 which are closely coupled and which are connected in series, the junction of these two secondary windings being connected by the neutral line 14 to one input terminal of the high gain amplifier 15. This amplifier in the arrangement of FIGURE 3 has an input transformer 40 with a secondary winding 31 connected across the amplifier input and three primary windings 42, 43, 44. The primary winding 42 is connected between the neutral line 14 and one terminal of the standard impedance 19, the other terminal of which is connected to the adjustable tap 18 on the ratio arm winding 13. The winding 43 is connected between the neutral line 14 and one terminal of the unknown impedance 17, the other terminal of which is connected to the ratio arm 12. The primary winding 14 is fed with the output current from the amplifier 15, the circuit including a current indicating meter 45.

With the arrangement of FIGURE 3, the amplifier 15, since it has a high gain, will feed current into the winding 44 such as to maintain the net input to the amplifier substantially at zero. If this input were zero, the resultant flux in the transformer 40 would be zero and the induced voltages of the windings of this transformer are zero. Using the same notation as before, since the ampere-turns in the inside windings must then add up to zero, then $$I_u N_u = I_s N_s + I_o N_o$$

where $N_u$, $N_s$ and $N_o$ are the numbers of turns on the windings 43, 42 and 44 respectively and $I_o$ is the amplifier output current. As the flux is zero, the induced voltages on all the windings of the transformer 40 are zero (to the degree of approximation considered) and therefore:

$$I_u = E_u Y_u$$
$$I_s = E_s Y_s$$

so that $$Y_u = \frac{Y_s E_s N_s}{E_u N_u} + \frac{I_o N_o}{E_u N_u}$$

It will thus be seen that the admittance of the unknown impedance 17 is given by the sum of two terms one of which can be determined from the setting of switches and the other of which can be read from the current indicating meter 45. The first term provides the coarse indication whilst the second provides the fine indication. As in the previous described embodiments, the standards and/or ratio arms may provide decade steps whilst the meter indicates fractions of a step.

The arrangements described with reference to FIGURES 1 to 3 can be used with pure resistive or pure reactive impedances or with complex impedances. It will be appreciated that in the case of complex impedances the indicating meter will give an indication representative of the modulus of the difference of the input currents through the unknown and standard impedances. In measuring primarily resistive impedances, the phase angle may be small and can be ignored and similarly in measuring purely reactive impedances, the loss angle may be so small that it can be neglected, particularly since, in each case, the meter readings represent only the fine adjustments. More generally, however, it is possible to resolve the amplifier output into the real and imaginary voltage components and to indicate separately the two components or to indicate both the modulus and phase angle so that both resistive and reactive components of complex impedances may be separately and accurately measured. FIGURE 4 illustrates one form of bridge circuit for doing this. It will be seen that the arrangement of FIGURE 4 is generally similar to that of FIGURE 1 and has an input transformer 10 with a primary winding 11 energised from an alternating current supply source and two closely coupled secondary windings 12, 13. The unknown impedance 17 is connected, between a tap 16 on the winding 12 and to the input of the high gain amplifier 15. In FIGURE 4 the amplifier is shown as having an input transformer 50 with a secondary winding 51 connected to the input terminals of the amplifier and three primary windings 52, 53 and 54. The current through the unknown impedance 17 is fed via an adjustable tap into the winding 53. The standard impedance is indicated diagrammatically in FIGURE 4 as consisting of two alternative standard resistors 55, 56 and two alternative standard capacitors 57, 58. These standards are connected between adjustable taps on the ratio arm winding 13 and taps on the input winding 52 of the transformer 50. An impedance or admittance may be represented by a vector, the tip of which, in general, might lie in any one of the four quadrants of the complex plane. To enable impedances or admittances in all four quadrants to be measured, the winding 52 has a centre tap connected to the neutral line so that the effective phase of the current through the resistive and/or reactive standards may be reversed. In FIGURE 4 the amplifier output voltage is applied through an auxiliary standard resistor 60 to the input winding 54 of the transformer 50. It will be understood that such an input transformer may be used in the arrangements of FIGURES 1, 2 and 3 for measuring complex impedances. The output voltage from the amplifier 15 is applied to an indicating unit 61 which has two phase sensitive voltmeters 62, 63. The voltmeter 62 is fed with a reference current from the alternating current supply through a lead 64 and is arranged to measure the magnitude of the alternating voltage component which is in phase with the supply voltage. The reference current to the voltmeter 63 is shifted in phase by 90° by means of a phase shifter 65 so that the voltmeter 63 measures the phase quadrature component. To cancel any small unwanted phase shifts that might occur in the transformer 10 and amplifier 15, a pre-set trimming phase shifter 66 is included in the phase reference signal circuit to the voltmeters 62, 63. The operation of the arrangement of FIGURE 4 is similar to that of FIGURE 1 except that the phase sensitive voltmeters 62, 63 separately indicate the resistive and reactive components of impedance.

It will immediately be apparent that an indicating system such as the system 61 having two phase sensitive voltmeters may be employed in the arrangements of FIGURES 1 and 2. An analogous system may be employed in the arrangement of FIGURE 3, although, in that arrangement, most conveniently the feedback current is converted into a voltage which can then be resolved and measured on two phase sensitive voltmeters as in the arrangement of FIGURE 4.

It will be seen that in all the above described embodiments an impedance or admittance can be measured as the sum of a quantity determined from switch settings and a quantity indicated on a meter or meters. The switch settings would normally be made by hand but could be done automatically by means of a servo-mechanism or stepping switches if required.

I claim:

1. An electrical bridge circuit for measuring an unknown impedance comprising a standard impedance, voltage sources for applying alternating voltages of known amplitude ratio to the standard and unknown impedances, a high gain amplifier having an input circuit and an output circuit, the input circuit including a transformer having a plurality of input windings, circuit means for feeding the currents through said unknown and standard impedances into input windings of said transformer in opposite senses to apply to the amplifier input a voltage representing the difference of these currents, a feedback circuit coupling said output circuit to a further one of said input windings on said transformer for feeding the amplifier output current through said further one of said input windings to apply to the amplifier input a voltage in opposition to that representing said difference of currents, and an indicator coupled to said output circuit to indicate the amplifier output.

2. An electrical bridge circuit as claimed in claim 1 wherein said indicator comprises a current indicating meter in the circuit feeding said further input winding.

3. An electrical bridge circuit for measuring an unknown impedance comprising a standard impedance, an alternating voltage supply source, two ratio arms coupled to said voltage supply source to provide voltage outputs of known amplitude ratio, means coupling said two ratio arms to said standard and unknown impedances respectively to feed currents therethrough, a high gain amplifier having an input circuit and an output circuit, said input circuit including a transformer with a plurality of input windings, a circuit coupling the amplifier output circuit to one of said input windings to feed a current derived from the amplifier output to said input circuit, circuit means feeding the difference in currents through said standard and unknown impedances to said input circut in opposition to the current from the amplifier output, and a current measuring indicator in series with one of said input windings for indicating the magnitude of the amplifier output.

4. An electric bridge circuit for measuring an unknown impedance comprising (a) a standard impedance, (b) an alternating voltage source for applying alternating voltages of known amplitude ratio to said standard and unknown impedances, (c) a high gain amplifier having an input circuit and an output circuit, (d) the input circuit including (e) a transformer having a plurality of input windings, (f) circuit means for feeding the current through the standard and unknown impedances into input windings of said transformer in opposite senses to apply to the amplifier input a voltage representing the difference of these currents, (g) a feedback circuit coupling said output circuit to a further one of said input windings on said transformer for feeding the amplifier output current through said further one of said input windings to apply to the amplifier input a voltage in opposition to that representing said difference of current, and (h) indicating means coupled to said output circuit to separately indicate the magnitudes of the components of the amplifier output which are in phase with or in phase of opposition to and which are in phase quadrature with the alternating signal from said alternating source.

References Cited in the file of this patent

UNITED STATES PATENTS

| | | |
|---|---|---|
| 2,476,496 | Kliever | July 19, 1949 |
| 2,554,164 | Wojciechowski | May 22, 1951 |
| 2,866,337 | Minneman et al. | Dec. 30, 1958 |
| 2,886,774 | Probus | May 12, 1959 |
| 2,908,166 | Johnson | Oct. 13, 1959 |
| 2,942,467 | Campani | June 28, 1960 |

FOREIGN PATENTS

| | | |
|---|---|---|
| 622,130 | Great Britain | Apr. 27, 1949 |
| 630,858 | Great Britain | Oct. 24, 1949 |
| 58,255 | France | Nov. 18, 1953 |
| 735,917 | Great Britain | Aug. 31, 1955 |
| 738,526 | Great Britain | Oct. 12, 1955 |
| 842,047 | Germany 1xb/42b | Oct. 13, 1955 |
| 1,113,985 | France | Apr. 6, 1956 |

OTHER REFERENCES

Cook: "Measuring Minute Capacitance Changes," Electronics, January 1953; pages 105–107.

Konigsberg: "Operational Bridge Gages High Capacitance," Electronics, January 1, 1957.